Dec. 13, 1938.                J. W. DAWSON                2,140,350
                             CONTROL APPARATUS
                           Filed Oct. 16, 1936
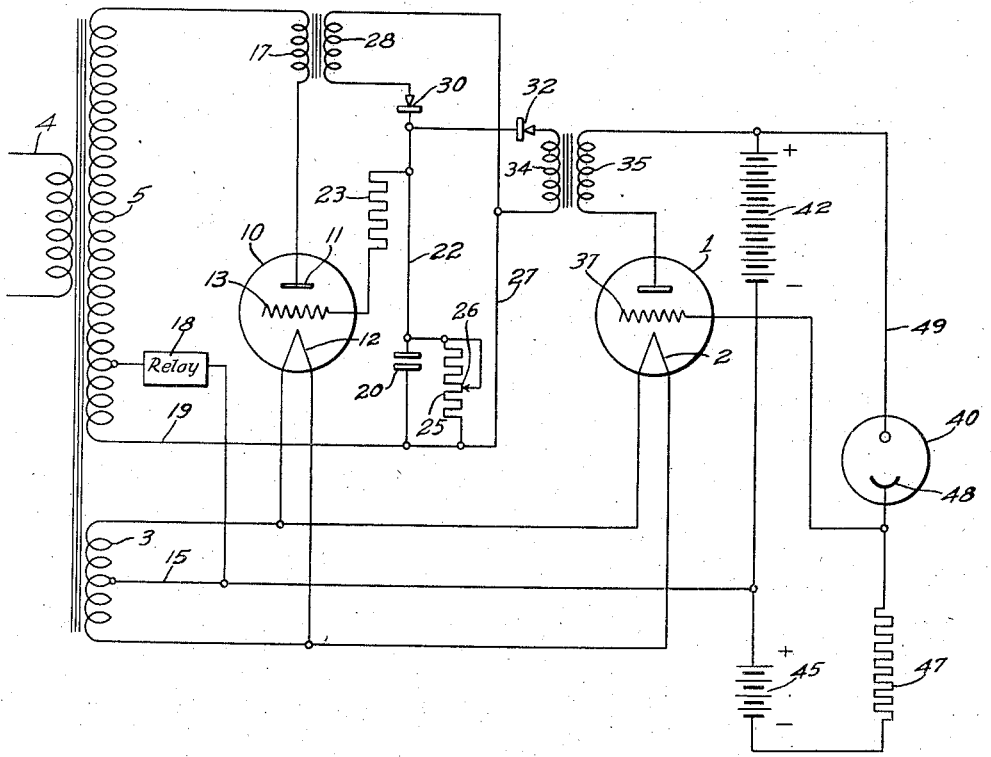
WITNESSES:                                              INVENTOR
                                                     John W. Dawson.
                                                   BY
                                                         ATTORNEY Patented Dec. 13, 1938

2,140,350

UNITED STATES PATENT OFFICE 2,140,350

CONTROL APPARATUS

John W. Dawson, East McKeesport, Pa., assignor to Westinghouse Electric & Manufacturing Company, East Pittsburgh, Pa., a corporation of Pennsylvania Application October 16, 1936, Serial No. 105,945

6 Claims. (Cl. 250—27)

This invention relates to the control of power circuits by means of a brief impulse such, for example, as may arise from the momentary illumination of a photocell.

It is an object of this invention to cause a brief impulse to charge a condenser and to prolong the time which will be required for the charge to dissipate.

It is a further object of this invention to provide arrangements for charging the condenser by the momentary impulse and further arrangements for charging the condenser by the starting of the plate circuit.

Other objects and details of the proposed apparatus will be apparent from the following detailed description and the accompanying drawing in which the single figure is a diagram of the circuits and apparatus in one embodiment of my invention.

In the figure, an amplifier tube 1 has the usual grid plate and cathode. The cathode is shown as a filament 2 which is energized from a secondary 3 of a transformer 4 having an additional secondary 5. The secondary 5 supplies power to an output tube 10 having a plate 11, a filament 12 and a grid 13. The filament 12 is connected to the ends of the secondary 3 and a mid-tap 15 affords connection to the filament 12. The secondary 5 is connected to the plate 11 through the primary 17 of a transformer. A relay 18 is connected to the mid-tap 15 and to a point near one end of the secondary 5. The portion of the secondary 5 between the connection of relay 18 and the terminal of the secondary 5 is connected by a lead 19 to a condenser 20. The other terminal of the condenser is connected by a lead 22 through the usual grid resistor 23 to the grid 13.

A resistor 25 is shunted around the condenser 20 and is rendered adjustable in any desired manner, for example, by a slider 26 which is connected to one terminal of the resistor 25.

The lead 19 extends to a common terminal of condenser 20 and resistor 25, and from there it is prolonged by a conductor 27 and thereby connected to one terminal of the secondary 28 of the transformer the primary 17 of which is in the plate circuit. The other terminal of the secondary 28 is connected through a rectifier 30 to the conductor 22 and so to that terminal of the condenser 20 nearest the grid 13.

Another rectifier 32 is connected to a secondary 34, the primary 35 of which is in the plate circuit of the tube 1. The grid 37 of the tube 1 is controlled in any desired manner, for example, by a photo-tube 40, the illumination of which, if desired, may be very brief. The plate circuit of the tube 1 is energized by a battery 42. The positive terminal of said battery 42 is connected through the primary 35 to the plate of the tube 1. The negative terminal is connected to the mid-tap 15, and thus to the cathode 2 which, like the cathode 12, is heated by current from the secondary 3.

A battery 45 in the grid circuit of the tube 1 has its positive terminal connected to the mid-tap 15. Its negative terminal is connected through a resistor 47 to the cathode 48 of the photocell 40. The anode of the photocell 40 is connected by a lead 49 to the positive terminal of the battery 42. The grid 37 is connected to the cathode 48 at the junction of the resistor 47 with said cathode.

In the operation of the device, the secondary 3 delivers heating current to the filaments 2 and 12, thereby producing a source of electrons in each of the tubes 1 and 10. The grid 37 of the tube 1 is biased negatively by the battery 45 which produces a difference of potential between the lead 15 and the grid 37. The action of the battery 45 is through the resistor 47 while the photocell 40 is dark. If the photocell be illuminated, the battery 42, in series with the battery 45, produces a current through the resistor 47 and the photocell 40 in series, the junction of resistor and photocell is therefore at a potential more positive than when the tube 40 is dark. The grid 37 thus becomes positive and current can flow through the tube 1. The current thus supplied by the battery 42 flows through the primary 35 and the tube 1 through to the mid-tap 15 and so back to the other terminal of the battery 42.

An impulse is thus produced in the secondary 34 by the starting of the current through the tube 1, which impulse is in the direction in which the rectifier 32 is conductive and delivers a positive charge to the condenser 20. The charge not only is stored upon the condenser but acts through the resistor 23 to produce a positive potential upon the grid 13 of the tube 10. The charge upon the condenser 20 is not permanent. It is dissipated by leaking away through resistor 25. The time during which the positive potential upon the grid 13 will be effective is thus determined by the relative magnitude of condenser 20 and resistor 25 and can be adjusted by adjustment of the resistor.

If the illumination of the photocell 40 is very brief, the plate current of the tube 1 dies away very quickly. In the act of dying away, it produces an impulse in the secondary 34. But it is in the direction in which the rectifier 32 is not conductive and so is without effect upon the charge of the condenser 20. The time the charge of the condenser endures is long enough to last beyond the beginning of the next half-cycle of secondary 5 during which it impresses a positive potential upon the plate 11. At the beginning of said half-cycle the grid 13 is positive and the tube 10 will therefore conduct current. As this current starts, it induces a current in the secondary 28, the direction of which is toward the wire 22 and is therefore the direction in which the rectifier 30 is conductive. This current therefore impresses a further positive charge upon the side of the condenser 20 which is toward the grid 13.

Even though the action of the secondary 34 has by this time died away, the action of the secondary 28 will prolong the time during which a positive charge upon the condenser 20 creates a positive potential of the grid 13. The tube 10 therefore continues to conduct during at least a part of the first half-cycle which makes the plate 11 positive after the photocell 40 was illuminated. It will therefore produce a current through the relay 18, which constitutes the load for the output of the device.

Many variations will occur to those skilled in the art, and the specific description and illustration of a single form of this invention is not to be regarded as a limitation. The only limitations which are intended are those necessitated by the prior art or expressly indicated in the accompanying claims.

I claim as my invention:

1. In combination, a source of alternating current, a discharge device having a control electrode and a plurality of principal electrodes, a first circuit for supplying a potential from said source between said principal electrodes, a second circuit for impressing a potential between said control electrode and one of said principal electrodes to increase the current between said principal electrodes, means for coupling said first circuit to said second circuit to impress a potential in said second circuit tending to maintain the increased current in said first circuit and an energy reservoir connected to be charged by the potential impressed through said second circuit and recharged through said coupling means from said first circuit.

2. In combination, a source of current, a discharge device having a control electrode and a plurality of principal electrodes, a first circuit for supplying a potential from said source between said principal electrodes, a second circuit for impressing a potential between said control electrode and one of said principal electrodes to increase the current between said prinicipal electrodes, means for coupling said first circuit to said second circuit to impress a potential in said second circuit tending to maintain the increased current in said first circuit and an energy reservoir connected to be charged by the potential impressed through said second circuit and recharged through said coupling means from said first circuit.

3. Apparatus according to claim 1, characterized in effect by discharging means for the reservoir of such character that the charge endures in said reservoir for more than a half-cycle of the alternating current source.

4. For use with apparatus for supplying power to a load from an alternating current source the combination comprising a main asymmetric electric discharge device having a plurality of principal electrodes and a control electrode, said principal electrodes to be connected in circuit with said source and said load, an auxiliary electric discharge device of the high-vacuum type having an input and an output circuit, a direct current source connected in said output circuit, means for so coupling said output circuit between the control electrode and a principal electrode of said main discharge device that a change in the conductivity of said auxiliary discharge device produces an increase in the conductivity of said main discharge device regardless of the polarity of the potential impressed between its principal electrodes at the instant that said change in conductivity takes place, and means for so coupling the prinicipal electrode circuit of said main discharge device to the control electrode of said main device that said increase in the conductivity of said main device is maintained once it occurs.

5. For use with apparatus for supplying power to a load from an alternating current source the combination comprising a main asymmetric electric discharge device having a plurality of principal electrodes and a control electrode, said principal electrodes to be connected in circuit with said source and said load, an auxiliary electric discharge device of the high-vacuum type having an input and an output circuit, a direct current source connected in said output circuit, means for so coupling said output circuit between the control electrode and a principal electrode of said main discharge device that a change in the conductivity of said auxiliary discharge device of short duration compared to a half-cycle of said source produces an increase in the conductivity of said main discharge device regardless of the polarity of the potential impressed between its principal electrodes at the instant the said change in conductivity occurs, and means for so coupling the principal electrode circuit of said main discharge device to the control electrode of said main device that said increase in the conductivity of said main device is maintained once it occurs.

6. Apparatus according to claim 5 characterized by the fact that the coupling means between the output circuit of the auxiliary device and the control electrode and a principal electrode of the main device comprises a capacitor which is charged through a rectifier on the occurrence of a change in the conductivity of the auxiliary device and the coupling means between the principal electrode circuit and the control electrode of the main device includes a connection for maintaining the capacitor charged.

JOHN W. DAWSON.